(12) United States Patent
Tripoli

(10) Patent No.: US 6,596,941 B2
(45) Date of Patent: Jul. 22, 2003

(54) A.C. ELECTRICAL POWER DELIVERY SYSTEM FOR A PICKUP TRUCK BED UTILITY BOX

(76) Inventor: Salvatore M. Tripoli, 3745 Countryside Rd., Sarasota, FL (US) 34233

( * ) Notice: Subject to any disclaimer, the term of this patent is extended or adjusted under 35 U.S.C. 154(b) by 146 days.

(21) Appl. No.: 09/880,555

(22) Filed: Jun. 13, 2001

(65) Prior Publication Data

US 2002/0189836 A1 Dec. 19, 2002

(51) Int. Cl.[7] .................. H02G 3/00; H01M 10/46
(52) U.S. Cl. .................. 174/68.1; 174/135; 307/9.1; 307/151
(58) Field of Search ................ 174/68.1, 68.2, 174/68.3, 72 A, 135; 307/9.1, 150, 151; 363/15, 34, 95, 131

(56) References Cited

U.S. PATENT DOCUMENTS

| | | | |
|---|---|---|---|
| 3,118,685 A | | 1/1964 | Jordan |
| 4,543,798 A | | 10/1985 | Page |
| 4,872,102 A | * | 10/1989 | Getter ................ 363/141 |
| 4,976,450 A | | 12/1990 | Ellefson |
| 5,013,055 A | | 5/1991 | Labrum |
| 5,019,767 A | * | 5/1991 | Shirai et al. ............ 307/150 |
| 5,219,446 A | | 6/1993 | Klepac |
| 5,303,969 A | | 4/1994 | Simnacher |
| 5,344,339 A | | 9/1994 | Cheslock |
| 5,616,968 A | * | 4/1997 | Fujii et al. ............ 307/66 |
| 5,727,835 A | | 3/1998 | Krush et al. |
| 5,810,168 A | | 9/1998 | Eggering |
| 6,065,942 A | | 5/2000 | Glidden et al. |
| 6,489,561 B2 | * | 12/2002 | Ziegler et al. ......... 174/72 A |
| 2002/0080636 A1 | * | 6/2002 | Delbridge ............. 363/131 |
| 2002/0153726 A1 | * | 10/2002 | Sumner ................ 290/1 A |

* cited by examiner

Primary Examiner—Dean A. Reichard
Assistant Examiner—Adolfo Nino
(74) Attorney, Agent, or Firm—Charles J. Prescott

(57) ABSTRACT

An a.c. electrical power delivery system for installation into a utility box attached to the bed of a pickup truck. This system delivers a.c. electrical power for operating light-duty equipment including power hand tools and electrical equipment to an included a.c. outlet connectable to a side wall of the utility box. An electrical power inverter is provided of the type which converts incoming d.c. electrical power to a.c. electrical power. The inverter is installable into the utility box in proximity to, and having an a.c. power output in electrical communication with, the a.c. outlet. This system may also include a separate d.c. electrical power storage battery or utilize the battery of the pickup truck. A wiring harness is connectable at one end thereof to a d.c. input of the inverter and extendable along the body of the pickup truck and connectable at another end of the wiring harness to the d.c. storage battery whereby d.c. electrical power is transferred by the wiring harness from the storage battery to the inverter when a.c. electrical power is demanded at the a.c. outlet.

3 Claims, 3 Drawing Sheets

A.C. ELECTRICAL POWER DELIVERY SYSTEM FOR A PICKUP TRUCK BED UTILITY BOX

BACKGROUND OF THE INVENTION

1. Scope of Invention

This invention relates generally to a power conversion apparatus which converts d.c. power from an electrical storage battery into a.c. power for operating hand tools and the like, and more particularly to a d.c. electrical power delivery system for installation into a utility box attached to the bed of a pickup truck.

2. Prior Art

The use of inverters as a means for providing limited amounts of a.c. electrical power for use in situations such as at construction sites and in remote locations or mobile use where a.c. power is not otherwise available are well known. These inverters range in size and capacity from smaller inverters which will deliver a full load current of up to about 1.1 watts or 15 amps while drawing a no-load current of 0.5 amps up to systems which will provide in excess of 2000 watts at a d.c. current draw of about 200 amps from a d.c. electrical power storage source. A battery of a vehicle may typically be used to provide about 50–100 d.c. amps to such an inverter for shorter time periods without draining the storage battery excessively.

However, to date, applicant is unaware of any prior art teaching directed to the incorporation of such a d.c. electrical power delivery system into popular utility boxes attached to the bed of a pickup truck. Such an installation would have many advantages and conveniences wherein a.c. electrical power would readily be available from a conventional weather-tight a.c. outlet connected to preferably an exterior side wall of the utility box of the pickup truck.

Applicant is aware of an armed pickup truck mounted tool box disclosed by Krush in U.S. Pat. No. 5,727,835. This disclosure teaches the installation of a security system for causing an audible or visible alarm when an unauthorized entry into the utility box is made. The system utilizes the storage battery of the pickup truck as a power source.

In U.S. Pat. No. 6,065,942, Glidden discloses a utility package including an air compressor and a tool compartment for installation in the bed of a pickup truck. However, there does not appear to be any teaching of an a.c. power outlet associated with this utility pack.

Another utility device for a pickup truck is disclosed by Simnicher in U.S. Pat. No. 5,303,969 which teaches a storage device attachable to the bed of a pickup truck wherein the storage area and a door affixed thereto are provided. Yet another pickup truck bed oriented device is disclosed by Page in U.S. Pat. No. 4,543,798 which teaches a tool carrier with a refrigeration component for mounting across the bed of the pickup truck. Here again, no a.c. power outlet is contemplated by these inventions or disclosures.

Another group of prior art patented devices are directed to various forms of tool chests and carriers with various utility equipment installed therein as follows:

U.S. Pat. No. 3,118,685 to Jordan
U.S. Pat. No. 5,013,055 to Labrum
U.S. Pat. No. 4,976,450 to Ellefson
U.S. Pat. No. 5,810,168 to Eggering
U.S. Pat. No. 5,344,339 to Cheslock
U.S. Pat. No. 5,219,446 to Klepac
U.S. Pat. No. 5,276,310 to Schmidt et al.
U.S. Pat. No. 5,906,381 to Hovatter However, none of these prior art disclosures known to applicant teach or contemplate providing a permanently installed a.c. power outlet associated with the tool box of a pickup truck.

BRIEF SUMMARY OF THE INVENTION

This invention is directed to an a.c. electrical power delivery system for installation into a utility box attached to the bed of a pickup truck. This system delivers a.c. electrical power for operating light-duty equipment including power hand tools to an included a.c. outlet connectable to a side wall of the utility box. An electrical power inverter is also provided of the type which converts incoming d.c. electrical power to a.c. electrical power. The inverter is installable into the utility box in proximity to, and having an a.c. power output in electrical communication with the a.c. outlet. This system may also include a separate d.c. electrical power storage battery or utilize the battery of the pickup truck. A wiring harness is connectable at one end thereof to a d.c. input of the inverter and extendable along the body of the pickup truck for connection at another end of the wiring harness to the d.c. storage battery whereby d.c. electrical power is transferred by the wiring harness from the storage battery of choice to the inverter when a.c. electrical power is demanded at the a.c. outlet.

It is therefore an object of this invention to provide a system for enhancing the utility of utility boxes attached to the bed of a pickup truck by providing a.c. power from a suitable weather-tight outlet permanently attached to a side wall of the utility box.

It is another object of this invention to provide a combination utility box installable into the bed of a pickup truck which includes an electrical system for utilizing d.c. power from the storage battery of the truck and, by further utilizing an inverter, for providing a.c. power to a conventional weather-tight outlet attached to a side wall of the utility box.

In accordance with these and other objects which will become apparent hereinafter, the instant invention will now be described with reference to the accompanying drawings.

DETAILED DESCRIPTION OF THE INVENTION

Figure 1:
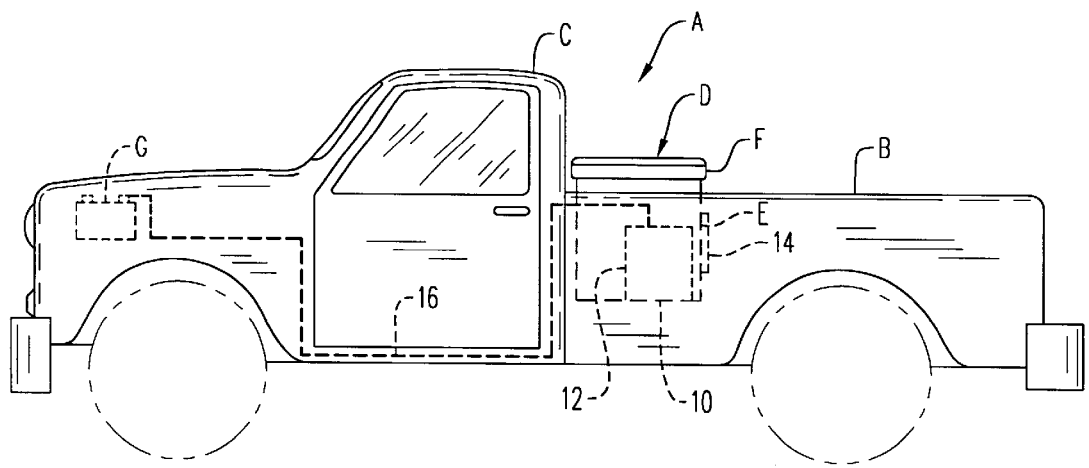
FIG. 1 is a side elevation view of a typical pickup truck having a rear bed and a utility box installed therein showing the invention as installed in hidden lines.
Figure 2:
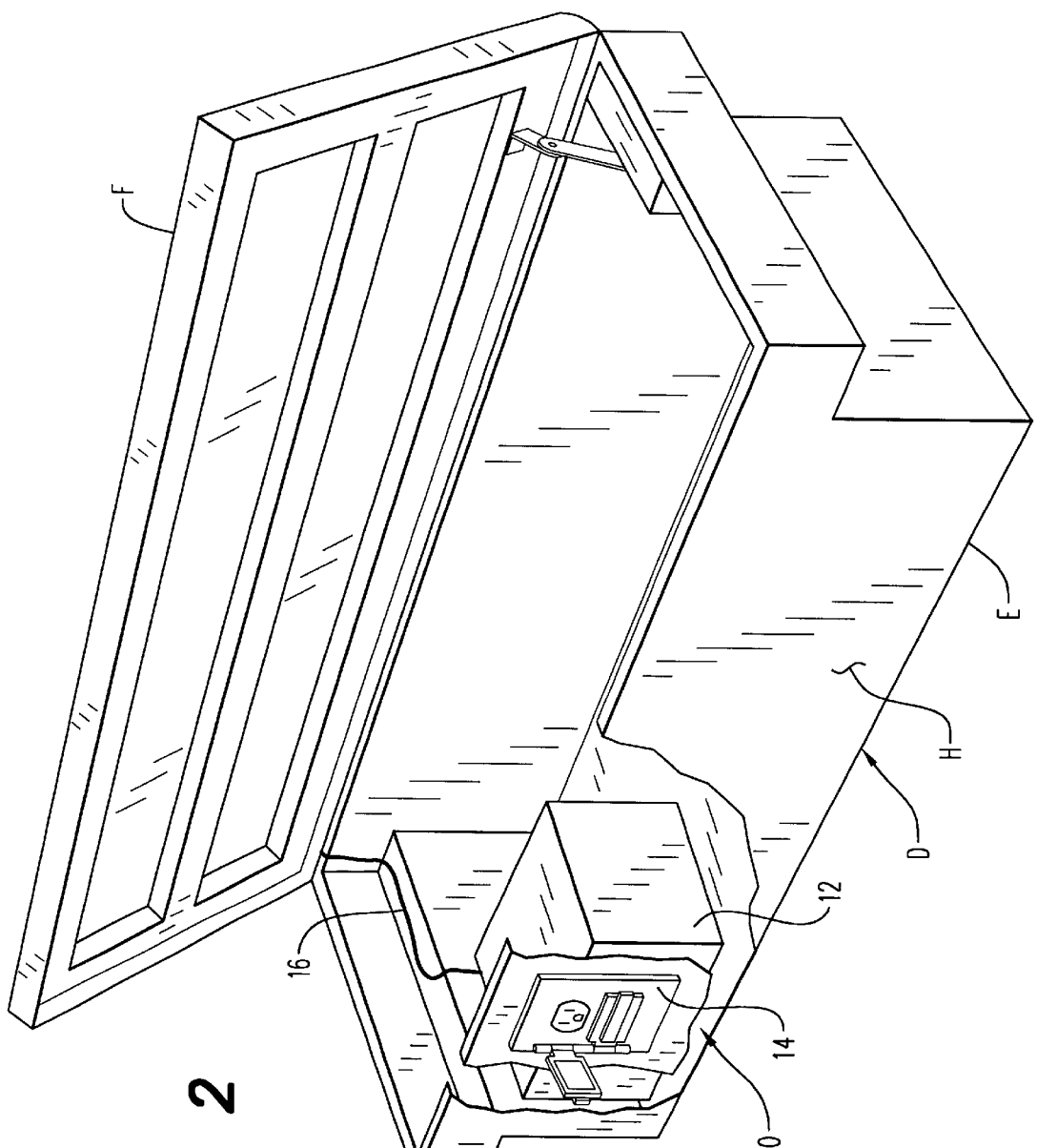
FIG. 2 is a perspective view of the utility box shown in FIG. 1 in an open configuration and showing, in broken view, the a.c. outlet and inverter attached within the utility box and depicting a portion of the wiring harness extending from the utility box.
Figure 3:
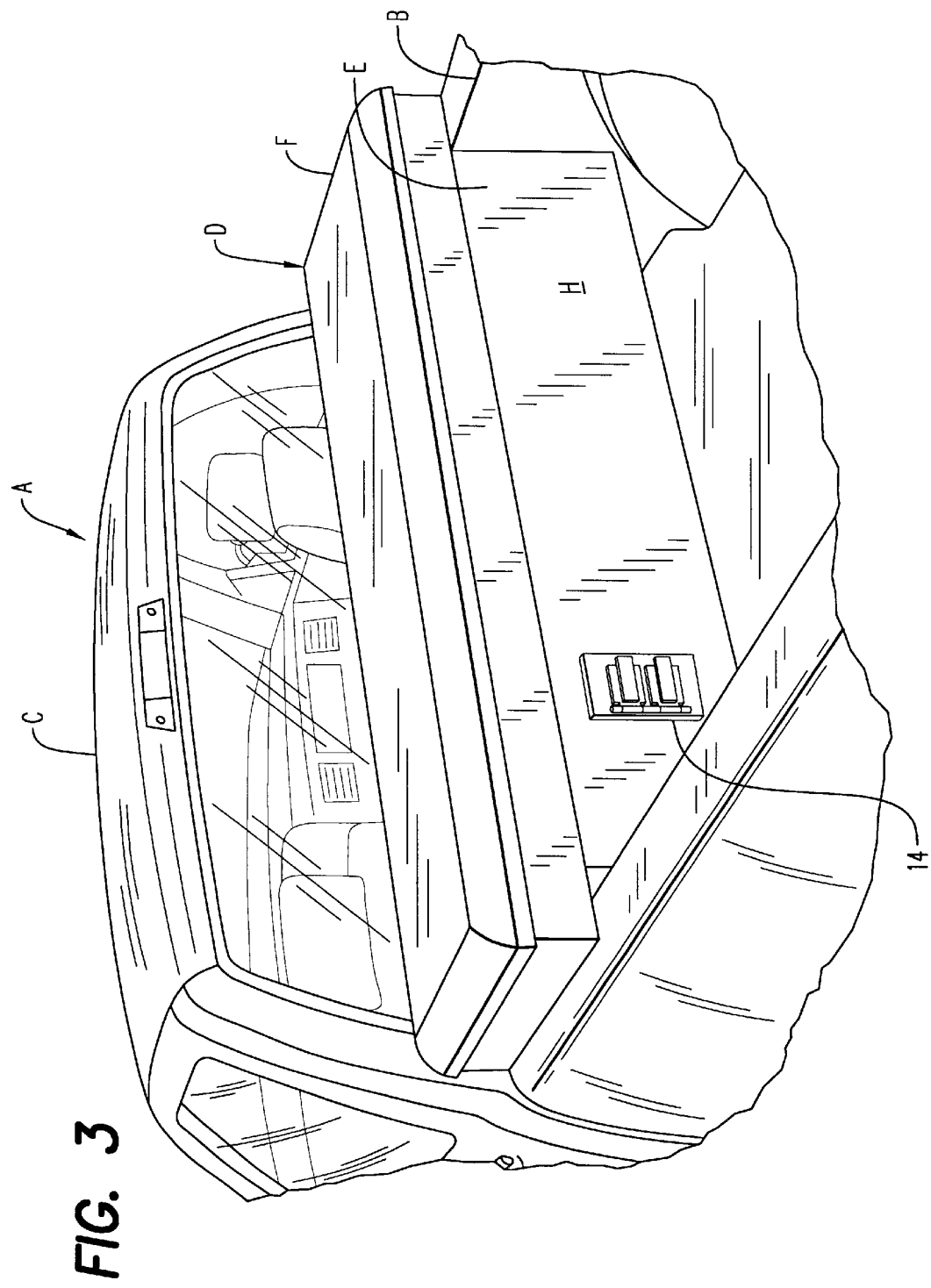
FIG. 3 is a rear perspective view of the pickup truck of FIG. 1.

Referring now to the drawings, a conventional pickup truck is shown generally at numeral A in FIGS. 1 and 3 and includes a cab C and a rear utility bed B formed as an integral part thereof. Virtually all pickup trucks such as A include a d.c. storage battery G within the engine compartment of the vehicle A. A utility box D, which includes a lower box E and an openable lid F best seen in FIG. 2, is mounted in the bed B just rearward of the cab C.

As best seen in FIG. 1, one aspect of the invention, shown generally at numeral 10, includes an inverter 12 mounted within the utility box D which, as previously indicated, rests on a bottom E and is attached to the bed B of the pickup truck A. The invention 10 also includes a conventional weather-tight a.c. electrical power outlet 14 mounted, preferably, on the rear facing exterior side wall H of the utility box D.

The a.c. outlet 14 is operably connected to an a.c. output of the inverter 12. A wiring harness shown generally at 16 is connectable at one end thereof to the output terminals of the storage battery G of the pickup truck A. The other end of the wiring harness 16 is connectable to a d.c. input terminal of the inverter 12. By this arrangement, when a.c. electrical power is required to be delivered to the a.c. outlet 14, the inverter 12 automatically draws sufficient d.c. current from the storage battery G and processes it internally of the inverter 12 to deliver a.c. current and electrical power to the outlet 14. Note that the means for providing and interrupting or stopping a.c. power delivery to the a.c. outlet 14 may be automatic on demand or manually switch controlled.

As seen in FIG. 2, another aspect of the invention is directed to the combination of the utility box D within which an inverter 12 is mounted and is operably connected to the weather-tight a.c. outlet 14 attached to the rear side wall H of the utility box D. The wiring harness 16 as previously described is interconnected between the inverter 12 and the storage battery G of the pickup truck A.

Figure 4:
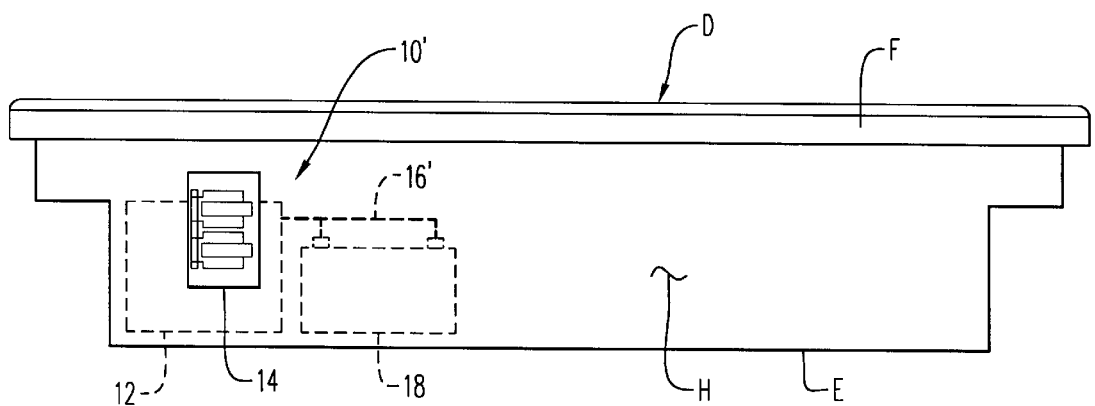
FIG. 4 is a rear elevation view of the utility box of FIG. 1 in an alternate embodiment of the invention.

In FIG. 4, yet another aspect of the invention is shown to include the a.c. power outlet 14, the inverter 12 and a separate additional d.c. storage battery 18 which is interconnected to the d.c. input terminal of the inverter 12 by a substantially foreshortened wiring harness 16'. This aspect of the invention may be provided either as an addition to an existing utility box D or connected as previously described directly into the utility box shown in FIG. 2 with the components of the system already installed therein and ready for immediate use.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An a.c. electrical power delivery system for installation into a utility box in the rear bed of a pickup truck comprising:

a weather-resistant a.c. outlet connectable to a side wall of the utility box;

an electrical power inverter of the type which converts incoming d.c. electrical power to a.c. electrical power, said inverter installable into the utility box in proximity to, and having an a.c. power output in electrical communication with, said a.c. outlet;

a wiring harness connectable at one end thereof to a d.c. input of said inverter and extendable and connectable at another end of said wiring harness to a d.c. electrical power storage battery of the pickup truck whereby d.c. electrical power is transferred by said wiring harness from the storage battery to said inverter when a.c. electrical power is demanded at said a.c. outlet.

2. An a.c. electrical power delivery system in combination with a utility box of the type sized for installation into the bed of a pickup truck comprising:

said utility box having upright side walls, a bottom and an openable lid;

a weather-resistant a.c. outlet connected to one of said upright side walls of said utility box;

an electrical power inverter of the type which converts incoming d.c. electrical power to a.c. electrical power, said inverter operably connected within the utility box in proximity to, and having an a.c. power output in electrical communication with, said a.c. outlet;

a wiring harness connected at one end thereof to a d.c. input of said inverter and extendable and connectable at another end of said wiring harness to a d.c. storage battery of the pickup truck whereby d.c. electrical power is transferred by said wiring harness from the storage battery to said inverter when a.c. electrical power is demanded at said a.c. outlet.

3. An a.c. electrical power delivery system for installation into a utility box attached to the bed of a pickup truck, said system for delivering a.c. electrical power for operating light-duty equipment including power hand tools, said system comprising:

an a.c. outlet connectable to a side wall of the utility box;

an electrical power inverter of the type which converts incoming d.c. electrical power to a.c. electrical power, said inverter installable into the utility box in proximity to, and having an a.c. power output in electrical communication with, said a.c. outlet;

a d.c. electrical power storage battery;

a wiring harness connectable at one end thereof to a d.c. input of said inverter and extendable and connectable at another end of said wiring harness to said d.c. storage battery of the pickup truck whereby d.c. electrical power is transferred by said wiring harness from said storage battery to said inverter when a.c. electrical power is demanded at said a.c. outlet.

\* \* \* \* \*